United States Patent
Bulkley et al.

(10) Patent No.: US 12,534,064 B1
(45) Date of Patent: Jan. 27, 2026

(54) ADAPTING MACHINE RESPONSE TO A TIME-RATE-OF-CHANGE OF A CONTROL INPUT

(71) Applicant: GM GLOBAL TECHNOLOGY OPERATIONS LLC, Detroit, MI (US)

(72) Inventors: Cody W. Bulkley, Milford, MI (US); Brenden Londeau, White Lake, MI (US); Jason D. Fahland, Fenton, MI (US); Saurabh Kapoor, Windsor (CA); Ehsan Asadi, North York (CA)

(73) Assignee: GM Global Technology Operations LLC, Detroit, MI (US)

( * ) Notice: Subject to any disclaimer, the term of this patent is extended or adjusted under 35 U.S.C. 154(b) by 51 days.

(21) Appl. No.: 18/787,254

(22) Filed: Jul. 29, 2024

(51) Int. Cl.
*B60W 30/045* (2012.01)
*B60T 8/1755* (2006.01)
*B60W 10/18* (2012.01)
*B60W 10/20* (2006.01)

(52) U.S. Cl.
CPC ....... *B60W 30/045* (2013.01); *B60T 8/17551* (2013.01); *B60W 10/18* (2013.01); *B60W 10/20* (2013.01)

(58) Field of Classification Search
CPC .... B60W 30/045; B60W 10/18; B60W 10/20; B60T 8/17551
USPC .......................................................... 701/70
See application file for complete search history.

(56) References Cited

U.S. PATENT DOCUMENTS

| | | | |
|---|---|---|---|
| 2018/0274461 A1* | 9/2018 | Ujihara | F02P 5/1502 |
| 2024/0400047 A1* | 12/2024 | Healey | B60W 30/12 |

* cited by examiner

*Primary Examiner* — Yi-Kai Wang
(74) *Attorney, Agent, or Firm* — Quinn IP Law

(57) ABSTRACT

A "configurator" sits logically between a control mechanism of a machine and an actuator of the machine. The configurator (which may, for example, be a separate hardware element or a method running on a computer processor) receives output signals from the control mechanism. Either those output signals contain a time-rate-of-change of the control mechanism or the configurator calculates the time-rate-of-change of the control mechanism by analyzing multiple control output signals. The configurator then alters a speed-of-response value of the actuator based on the control mechanism's time-rate-of-change and sends commands to the actuator based on its revised speed-of-response. The actuator responds to the commands to alter an aspect of the machine's behavior.

20 Claims, 4 Drawing Sheets

300

302 Receive control output values from one or more controls.

304 Receive one or more sensor-status values.

306 Calculate time-rate-of-changes of one or more controls.

308 Modify speed-of-response values for one or more actuators based on the calculated time-rate-of-changes and, in some cases, sensor values and historical data.

310 Send control signals to one or more actuators.

ADAPTING MACHINE RESPONSE TO A TIME-RATE-OF-CHANGE OF A CONTROL INPUT

INTRODUCTION

For many machines, an operator (human or otherwise) may change the machine's behavior by manipulating a "control" mechanism. The output of the control mechanism is communicated to an "actuator" that causes the machine to change its behavior to match the operator's desire. To use an example that appears repeatedly throughout this disclosure, a human is operating an automobile and wishes to turn. The human turns the steering wheel which causes a steering actuator to change the direction of the front wheels, thus turning the automobile.

The linkage between the control mechanism and the actuator may take many forms. Sometimes, as in rack-and-pinion steering, the linkage is strictly mechanical. Other times, the linkage is "fly-by-wire" where, for example in airplanes, a pilot's control inputs are sent to the flight actuators via analog or digital communications systems. Some control-to-actuator linkages may include a computer that interprets the outputs of the control mechanisms, possibly in light of contextual information it receives from status sensors in the machine, and then acts on those control outputs as the computer sees fit by issuing commands to the actuators.

SUMMARY

According to certain aspects of the present disclosure, a "configurator" sits logically between a control mechanism of a machine and an actuator of the machine. The configurator (which may, for example, be a separate hardware element or a method running on a computer processor) receives output signals from the control mechanism. Either those output signals contain a time-rate-of-change of the control mechanism or the configurator calculates the time-rate-of-change of the control mechanism by analyzing multiple control output signals. The configurator then alters a speed-of-response value of the actuator based on the control mechanism's time-rate-of-change and sends commands to the actuator based on its revised speed-of-response. The actuator responds to the commands to alter an aspect of the machine's behavior.

In some embodiments, the machine is a motor vehicle. A human operator drives the vehicle by manipulating the steering wheel and the accelerator and brake pedals. The configurator analyzes the driver's time-rate-of-change of those control mechanisms and alters the speed-of-response of actuators in the vehicle that change the direction of the steered wheels, the amount of braking force applied, and the vehicle's acceleration.

In some embodiments, the configurator considers the current time-rate-of-change of the control mechanism but also "historical" data, weighting the historical time-rate-of-change data along with the current value when determining how to alter the actuator's speed-of-response value.

In some embodiments, the configurator's alteration of the actuator's speed-of-response is based on the outputs of more than one control mechanism. Also in some embodiments, the configurator alters more than one actuator's speed-of-response based on the outputs of the control mechanism. In these embodiments, the multiple actuators may act to alter different behavioral aspects of the machine or may work together to alter the same behavioral aspect as, for example, when a steering actuator and a braking actuator work together to steer a motor vehicle.

In some embodiments, the configurator receives status information from a sensor that reports on some aspect of the machine. The configurator uses that status information when determining how to modify the speed-of-response value of the actuator. Again using the vehicle example, if a lateral accelerometer sensor tells the configurator that the vehicle is experiencing very high lateral loads (that is, the vehicle is turning very energetically), then the configurator may produce a lower speed-of-response for the turning actuator than it would if the vehicle were steering moderately. Other machine-status sensors may report on longitudinal acceleration and speed.

BRIEF DESCRIPTION OF THE DRAWINGS

While the appended claims set forth the features of the present techniques with particularity, these techniques, together with their objects and advantages, may be best understood from the following detailed description taken in conjunction with the accompanying drawings of which:

Figure 1:
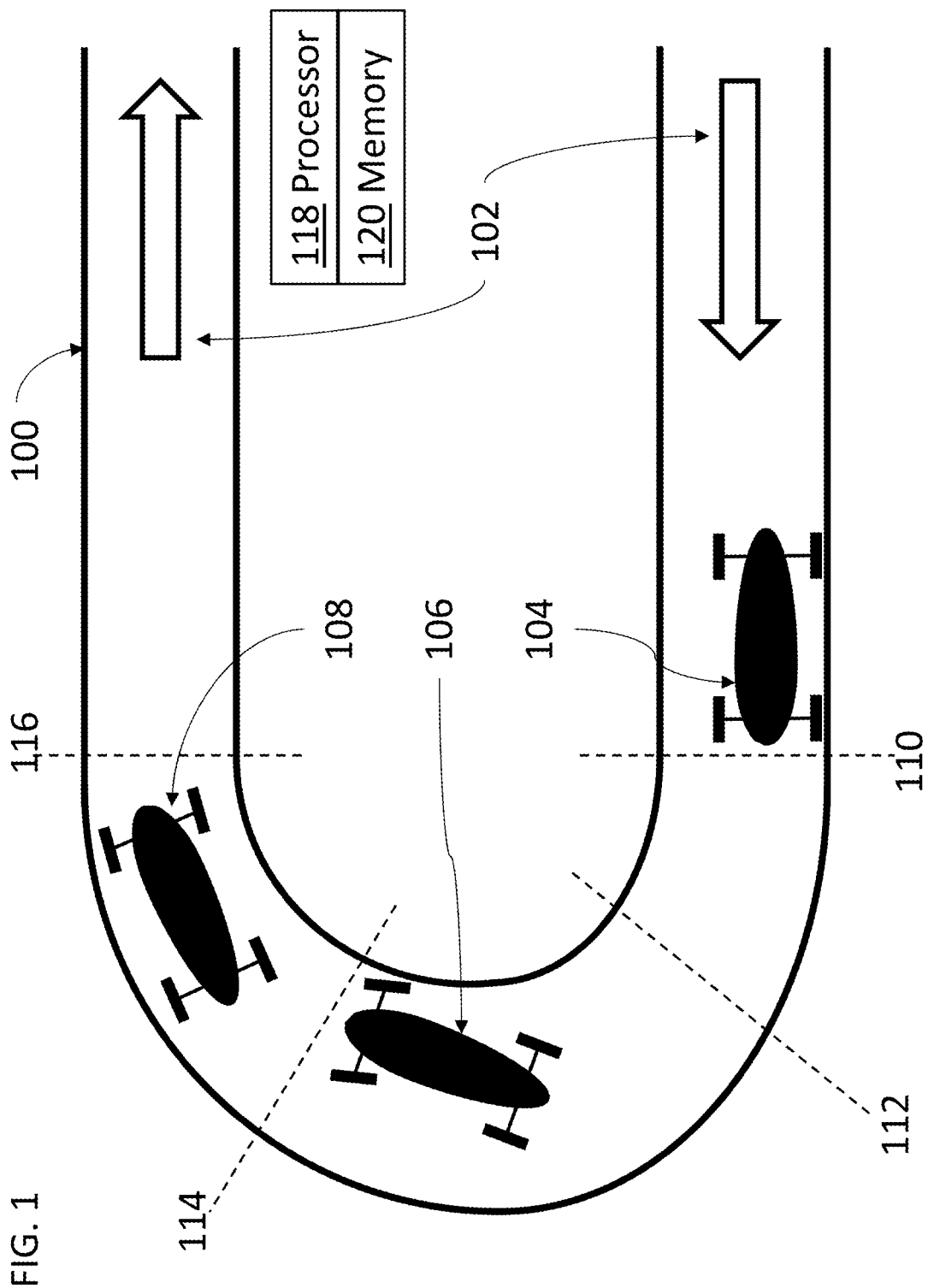
FIG. 1 is a simplified diagram of a representative environment in which the techniques of the present disclosure may be practiced.

The drawings are not necessarily to scale and may present simplified representations of various features of the present disclosure. Details associated with such features are determined in part by a particular intended application and environment of use.

DETAILED DESCRIPTION

In many cases when an operator (human or otherwise) manipulates a control mechanism in order to change a machine's behavior, the operator's manipulation is characterized by two distinct factors. The first factor is the control mechanism's final setting after the manipulation. On a large steamship, for example, the setting on an engine telegraph on the bridge is changed from "Half Ahead" to "Full Astern." The second factor is the speed with which the operator moves the control mechanism from its initial to its final setting.

The first factor (setting) is assumed to be significant in that it is, in fact, the primary reason for manipulating the control mechanism. In some situations, however, the second factor (the speed of the control mechanism change) is of little or no significance, as when a machine by its nature may respond very slowly to this control mechanism. Such is the case with the engines on a large steamship. Similarly, when a motor vehicle is driven sedately on a public road, and the driver has surrounded himself with a comfortable zone between his vehicle and the others on the road, the speed of application of the brakes in order to maintain a safe following distance is usually, within reasonable limits, of little significance.

Yet on other machines or in other situations, the speed of the control manipulation may be very significant. In the motor vehicle example, if the driver is suddenly confronted with a dangerous situation such as a rapidly diminishing closing distance to the vehicle ahead, the driver may both (i) push the brake pedal to the floor (setting factor) to achieve a maximum braking effect and (ii) also push hard enough to begin that maximum braking as quickly as possible (control-speed factor).

Throughout this disclosure, a motor vehicle is used as an example of a machine controlled by an operator. This example is used because many readers are quite familiar with such a machine and with its control environment. It should be kept in mind, however, that many other types of machines are considered such as, for example, machine tools like a drill press or metal-working lathe, a piano, and even a hammer, where the control mechanism and the machine are one. Each of these machines responds to both the setting factor of its control mechanisms and the speed factor with which its control mechanisms are manipulated to achieve those settings. The techniques of the present disclosure may be applied to at least some of these other machines.

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

FIG. 1 returns the discussion to the example of motor vehicles. The figure shows a portion of a racetrack 100 with the racing direction indicated by arrows 102. The illustrated portion of the racetrack 100 includes a right hairpin corner. Racetracks 100 in general may also have corners other than hairpins, and the particulars of the present discussion may need to change slightly for other types of corners, but the hairpin corner of FIG. 1 as used herein serves to illustrate most aspects of the present disclosure. On the racetrack 100 are three racing cars 104, 106, and 108 which may also be considered to be one and the same racecar 104, 106, 108 at various points along the racetrack 100. For purposes of this illustration, the hairpin corner is divided into three stages: the corner entry beginning at the end of the previous straightaway 110, the mid-corner beginning at the end of the corner entry 112, and the corner exit beginning at the end of the mid-corner 114 and continuing until the beginning of the following straightaway 116.

First consider the first control factor, that is, the typical settings of the control mechanisms of the racecars 104, 106, 108 during each stage of the hairpin corner. Having accelerated down the previous straightaway, the racecar 104 has achieved a speed that is too fast for reliably navigating the corner. Thus, the operator of the racecar 104 is now hard on the brakes to slow down. As is common with many racing drivers, he does most of his braking in a straight line before corner entry at 110, so the steering is in the neutral position.

The operator transitions into the hairpin corner entry (not shown) at reduced speed by turning to the right. The braking is (at least mostly) done by now, so the brakes are off or nearly so. Once the racecar takes a set in the corner, the operator transitions to applying the "gas" to accelerate through the remainder of the corner.

The racecar 106 is in mid-corner and is experiencing the greatest lateral forces in the hairpin corner. Braking is definitely done by now, the accelerator is full on (or close to it, depending upon various aspects of the racecar 106 and on the racing surface mid-corner), but the steering may be adjusted from what it was during the corner entry to keep the racecar 106 in a generally neutral steering poise.

Having made it to 114, the racecar 108 transitions to the corner exit with the cornering forces pushing it to the outside (driver's left) of the racetrack 100. The operator transitions to full acceleration if he wasn't there already in mid-corner, and "unwinds" the steering from its mid-corner position, coming to the neutral steering position as the racecar (not shown) exits the hairpin corner and proceeds down the following straightaway.

The above description of the control setting factors throughout the hairpin corner applies with small variations to every practiced racecar driver. However, the pace of the "transitions" in the above description depend strongly on the other control factor, the speed of application of the control mechanisms, and this may vary dramatically among drivers and may even change for one driver during one race. Because of this variance, the remainder of the present discussion focuses primarily on this second control factor.

Consider one driver, "Francis Fast-Hands," who manipulates her racecar much more dramatically than is the norm. For example, at 110, she very quickly moves the steering wheel from the neutral setting of the straightaway to the right-turn setting required for corner entry. Another driver, "Considered Chuck," is at the opposite end of the spectrum of control speed: At the same point 110 on the racetrack 100, he takes quite a bit more time to turn the steering wheel. Both Francis and Chuck navigate the hairpin corner successfully, and neither's method is necessarily better than the other's because quick-to-the-mark precision and smoothness of operation are both valuable when driving near the limits of the racecar 104, 106, 108.

Francis and Chuck clearly differ in their preferences for driving-control response speed. Both drivers want precision, while Francis' manipulation of the control mechanisms shows that she prefers a quick response factor, while Chuck is more comfortable with a slower response. If the racecars 104, 106, 108 are destined purely for one racing situation and if each one is to be driven by one driver, then each driver will probably have his racecar 104, 106, 108 specifically tuned to produce his desired speed-of-control response.

More realistically, on the other hand, if the racecars 104, 106, 108 are to be driven by different drivers at different times, then tuning them to one extreme or the other of a speed-of-response factor would make some drivers very uncomfortable, maybe even put them into an unsafe condition. Also, if the racecars 104, 106, 108 are ever driven on public roads, then the speed-of-response factors that Francis and Chuck want on the racetrack 100 may not be appropriate when driving far from the vehicles' limits. Drivers may even wish for different control-response speeds on different racetracks or on the same racetrack during different surface conditions. These considerations combine when a vehicle is manufactured for street use but may conceivably be raced. The control mechanisms of such a vehicle are tuned so that its street performance is suitably unfrightening for the mythical "average" driver on the street, even at the cost of ultimate performance on the street or racetrack 100.

Indeed, that is what happens today. Even those street vehicles with the highest potential performance leave the factory with their control mechanisms "tuned" to an acceptable baseline setting. Both Francis and Chuck probably appreciate this baseline setting when driving on the public roads, but if they take such a car to the racetrack 100, then they both feel the limitations of this compromise.

Figure 2A:
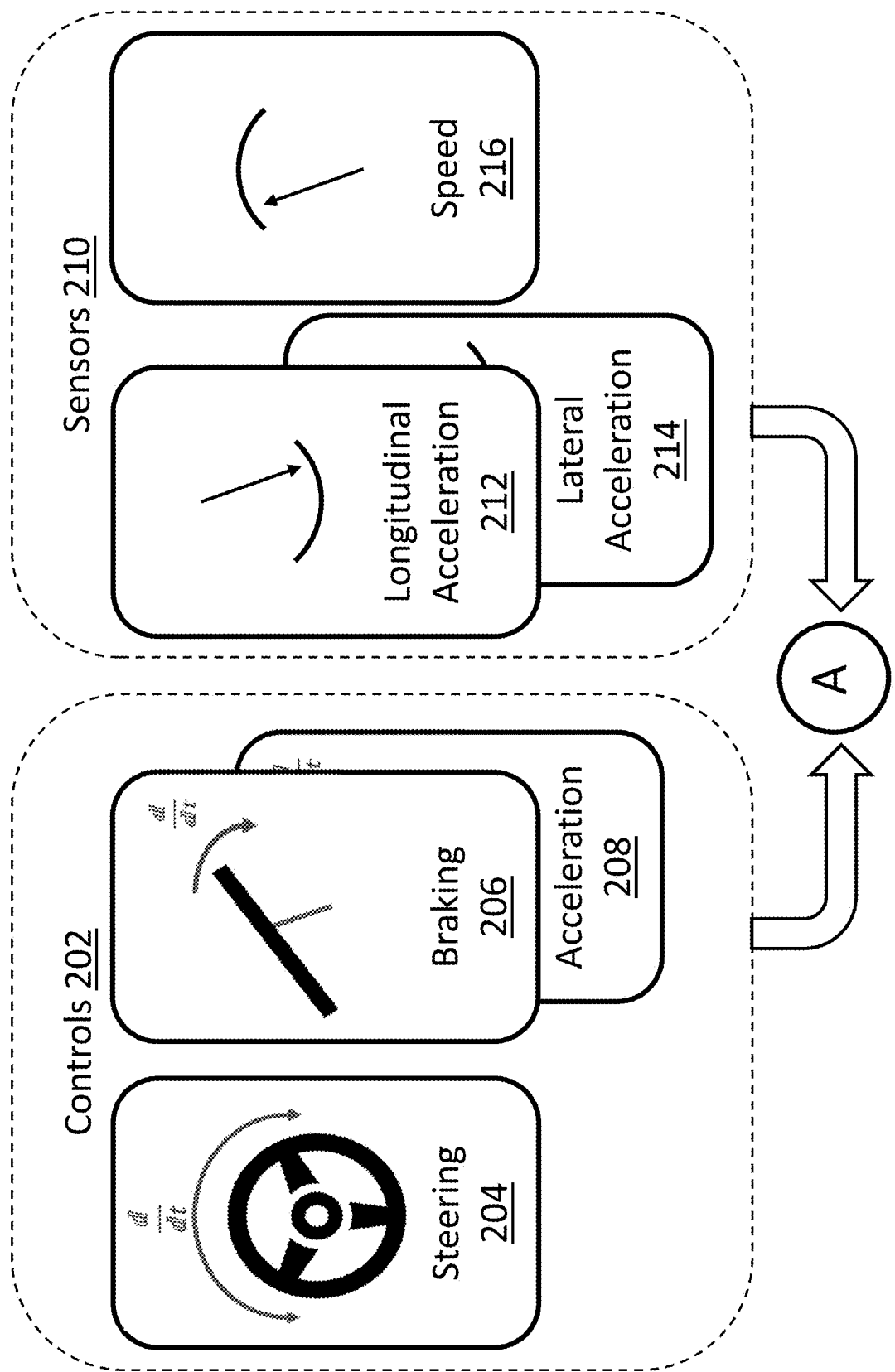
FIGS. 2A and 2B together form a schematic of a system that incorporates a control-to-actuator configurator.
Figure 2B:
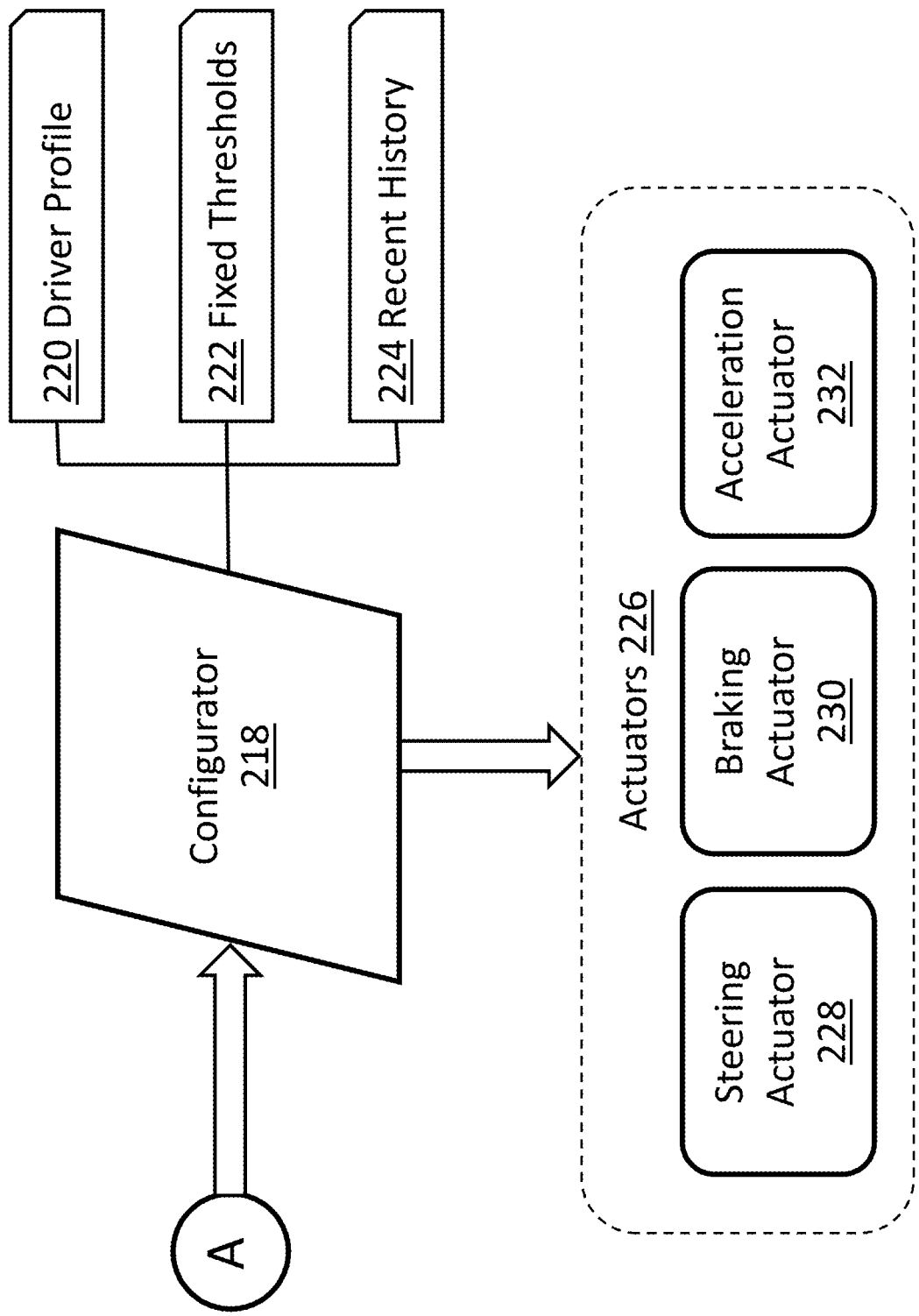

This is where the techniques of the present disclosure come into play. FIGS. 2A and 2B present a system 200 that adjusts the speed-of-response factors for the actuators of a machine in order to make the machine's response come closer to its operator's ideal.

The present discussion returns to the non-limiting example of the motor vehicles of FIG. 1. That example is here refined somewhat by specifying that the racecars 104, 106, 108 are manufactured for use on public roads, although their use on the racetrack 100 may have been contemplated by their manufacturers.

As discussed above in reference to FIG. 1 but made more explicit in FIG. 2A, the racecars 104, 106, 108 include a set of operator-manipulable control mechanisms 202. Vehicles designed for the public road generally include a steering-wheel control mechanism 204, a brake-pedal (or brake-hand) control mechanism 206, and an acceleration control mechanism 208. This set of control mechanisms 202 is used purely for the sake of illustration. Most vehicles include other control mechanisms, and some vehicles do not even include some of the control mechanisms in the set 202 (e.g., a train locomotive does not have a steering control mechanism 204). Non-vehicle machines have a set of control mechanisms suited to their use that may go far beyond the illustrated set of control mechanisms 202.

Though not explicitly discussed in reference to FIG. 1, vehicles and other machines often also include a set of sensors 210 that report on various aspects of the vehicle's behavior. Many vehicles (though generally not pure racecars) include a speed-over-the-ground sensor 216. Some may include longitudinal 212 and lateral 214 accelerometers. Not shown but common are fluid-temperature sensors, tachometers, odometers, voltage meters, and the like. Other sensors exist for particular usage, such as a hull-pressure sensor on an airplane or submarine. Non-vehicle machines may include their own particularized set of sensors 210. Many other sensors are contemplated, with their presence depending upon the machine's intended operating environment.

As they operate, the control mechanisms 202 and sensors 210 repeatedly produce their output values. Some of those values are sent to a configurator 218 as shown in FIG. 2B.

In some embodiments, the configurator 218 may be implemented as a control module supported by a computing architecture exemplified in FIG. 1 by one or more a computer processors 118 and one or more computer memories 120. The memories 120 store instructions executable by the processors 118. The processors 118 may be one or various combinations of application-specific integrated circuits, field-programmable gate arrays, electronic circuits, and central processing units, e.g., microprocessors. The associated memory components 120 may be in the form of non-transitory memory and storage devices (read only, programmable read only, random access, hard drive, etc.). The computing architecture 118/120 may include software or firmware programs, routines, combinational logic circuits, input/output circuits and devices, signal conditioning and buffer circuitry, and other components that can be accessed by the processors 118 to provide the functionality described in the present disclosure.

Figure 3:
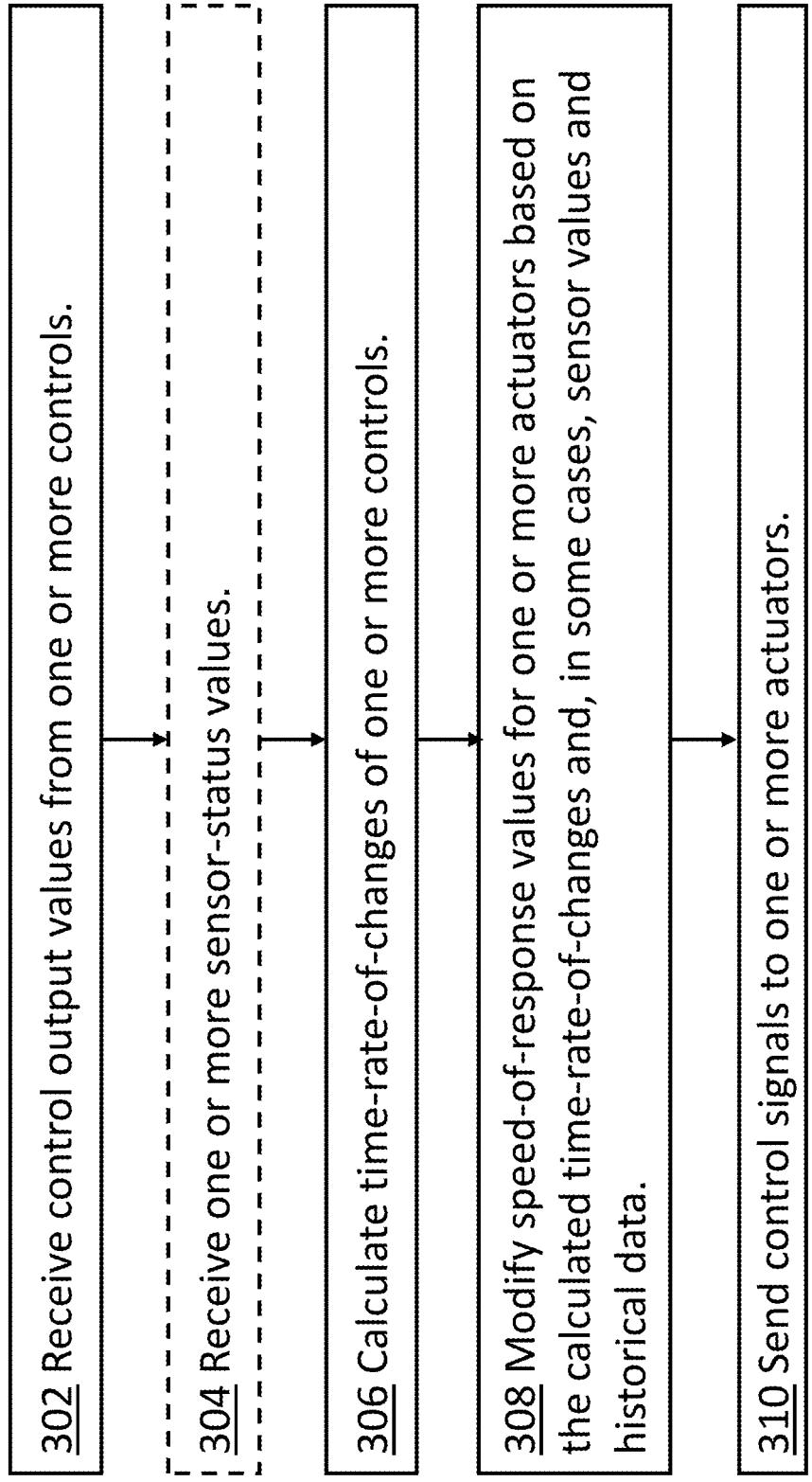
FIG. 3 is a flowchart of a method for adapting a machine's response to its control inputs.

Some embodiments of the basic operation of the configurator 218 are discussed in reference to the flowchart of the method 300 of FIG. 3. Illustrative examples and variations on the configurator's 218 operation 300 are considered upon completion of the discussion of FIG. 3.

In step 302, the configurator 218 receives output values from at least one of the machine's control mechanisms 202. The format of these output values may vary depending upon the implementation of the particular control mechanism 202. Often, the control mechanism 202 periodically sends the current value of its setting. For example, every ¹⁄₁₀₀th of a second, a steering control mechanism 204 reports on how many degrees, clockwise or counterclockwise, the steering wheel is currently set. Instead of following a strict periodicity, a more sophisticated control mechanism 202, such as is seen in come computerized automation settings, may send out its current setting along with a timestamp for when that setting is valid. This allows the control mechanism 202 to report less frequently when its setting is not varying much. Other control mechanisms 202 periodically send out their absolute settings and then, between the regular periods, send out updates if needed, the updates either with absolute settings or differentials from the previous periodic report. It is conceivable that some control mechanisms 202 could even report on both their absolute settings and on the time-rate-of-change of those settings. Other possibilities of the format of the control output values are contemplated and may be accommodated by the configurator 218.

In optional step 304, the configurator 218 receives at least one sensor status value reporting on some aspect of the machine's current behavior. Depending on implementation, the format of sensor status values may vary just as may the format of the control output values discussed immediately above. Still, the most common format is probably the periodic reporting of the absolute sensor value such as, for example, the value of an engine-oil temperature reported once per second.

In step 306, the configurator 218 calculates the time-rate-of-change for the control mechanism whose output values it receives in step 302. If, as is usual, the format of the control output value is one absolute setting for each fixed period, then calculating the time-rate-of-change is straightforward based on a sequence of output values. For example, if the steering control mechanism 204 reports a steering angle of 10 degrees clockwise at time T=0.0 seconds, 10.1 degrees clockwise at time T=0.01 seconds, etc., in even progression, then the time-rate-of-change of the steering control mechanism 204 is calculated to be 0.1 degrees clockwise every 0.01 seconds or 10 degrees clockwise per second. The calculation of the time-rate-of-change of the control mechanism varies with the format of the control mechanism's output, of course, and that calculation is generally straightforward. If the control mechanism is one of the rare types whose output values specifically include the time-rate-of-change, then step 306 is skipped.

The previous paragraph does not specify over what time period the time-of-change of the reporting control mechanism is to be calculated. If the period is too short, then the configurator 218 may produce overly "frenetic" and unpredictable results by the end of the method 300 of FIG. 3. If the period is too long, then the calculation becomes meaningless. For an extreme example, when the racecar 104, 106, 108 arrives at a set place on the racetrack 100 after one more lap, its control mechanisms will be in approximately the same position as they were one lap ago. Thus, if the time-rate-of-change of a control mechanism is calculated over a period approximately equaling the lap time of the racecar 104, 106, 108, then the calculation will wash out the details and yield no change. Realistically, in some situations, a fixed period may be programmed into the configurator 218. In other situations, the configurator 218 may itself determine a reasonable value for this period by considering how quickly, and by how much, the output values coming from the control mechanism are changing, with greater or quicker changes probably yielding shorter periods for calculating the time-rate-of change. In some embodiments, this period may be determined experimentally to produce the best results as perceived by a given operator.

Having calculated (or received from the control mechanism itself) the time-rate-of-change of the control mechanism, the configurator 218 in step 308 uses that calculation to modify a speed-of-response value of at least one of the machine's actuators. Because the actuators have not been thoroughly discussed yet, the discussion now turns back to FIG. 2B. After discussing the actuators, the discussion returns to this step 308.

In the first paragraph of the present discussion, a distinction was drawn between a machine's control mechanisms 202 that receive the operator's commands and the actuators that carry out those commands by altering the behavior of the machine. Again using the familiar example of a motor vehicle, FIG. 2B shows a representative set 226 of actuators. When the operator turns the steering control mechanism 204 of FIG. 2A, the steering actuator 228 of FIG. 2B alters aspects of the vehicle's physical steering mechanism and thus changes the machine's behavior. On a typical car, turning the steering wheel 204 causes the steering actuator 228 to turn the front wheels. On a typical modern tank, turning the steering wheel 204 tells the steering actuator to differentially direct power to the treads, thus causing the tank to turn. Other typical actuators in a motor vehicle include a braking actuator 230 and an acceleration actuator 232.

From contemplating these examples, it may be seen that the actuators in a set 226 may vary widely from machine to machine. Some may be quite straightforward mechanically as with a rack-and-pinion steering actuator mechanically coupled to a steering control mechanism 204 and also mechanically coupled to the steering knuckles of a motor vehicle. Many other actuators are controlled by a computer rather than being mechanically linked to the outputs of their control mechanisms. In the present discussion, the configurator 218 is a function of that computerized actuator control mechanism.

Every actuator has a speed-of-response value. Most often, this response speed is a built-in characteristic of the actuator and may not be altered. For example, no matter how quickly the helm of an exemplary large steamship is turned from dead ahead to full port rudder, the actuator mechanism rotates the rudder at one given speed in degrees per second. Some electrically controlled actuators include a stepper motor. In some cases, these actuators respond to two commands, e.g., "turn the output shaft by 0.1 degree clockwise or 0.1 degree counterclockwise." While the speed with which the stepper motor responds to each command is fixed, the response speed of the actuator as a whole may be varied by changing the rate at which the individual commands are sent: More commands per second causes the stepper to turn the output shaft more increments of 0.1 degree in each second. Finally, and similarly to the contemplated advanced control mechanisms that may report their time-rate-of-change, it is contemplated that advanced actuators may be made that may respond to commands that explicitly state a desired response speed.

Keeping the above in mind, the discussion returns to the method of operation 300 of the configurator 218. Just before the discussion of actuators, the discussion considered step 308 where the configurator 218 was modifying the speed-of-response value of an actuator. The configurator 218 determines the new speed-of-response value based on a number of factors. First, it compares the calculated (or received) time-rate-of-change of the control mechanism to a baseline value, or fixed threshold range (222 in FIG. 2B), which is generally set by the machine's manufacturer. If, for example, Francis Fast-Hands is steering, then the configurator 218 notes that the time-rate-of-change received from the steering control mechanism 204 is significantly greater than (that is, she is steering faster than) the fixed baseline 222.

To better accommodate Francis's driving style, the configurator 218 consults a factory-set stored value (also in 222) for the speed-of-response of the steering actuator 228 and controls the steering actuator 228 (this in step 310) with an increased speed-of-response. As discussed above, for many actuators, this means that the configurator 218 sends incremental commands (e.g., "clockwise 0.1 degree") at a greater rate to the steering actuator 228. The means used by the configurator 218 to modify the speed-of-response of other types of actuators is easily imagined, given the discussion above. In a similar manner, the configurator 218 may control the steering actuator 228 of Considered Chuck to provide a somewhat slower speed-of-response rate than is given by the baseline 222. If the received time-rate-of-change of the steering control mechanism 204 is at the baseline 222 or near enough to it, then the configurator 218 uses the factory-set response rate for the steering actuator 228.

The end result of the intervention of the configurator 218 is a response rate of an actuator that better matches the operating style of each individual operator better than may a single, factory-fixed value. One motor vehicle, with its factory configuration unaltered, proves to be exceptionally responsive in Francis's hands and less frenetic in Chuck's. This makes each driver more comfortable and thus more effective when controlling the vehicle near its limits.

While the overall operation of the configurator 218 is presented above, it is amenable to many subtleties and variations. When the configurator 218 adjusts an actuator's speed of response, it might not "jump" immediately from the factory setting to one that aligns with the driver's current control inputs. Instead, it may make a modest step in that direction and continue to refine the actuator's response speed by looping through the method of operation 300. This cautious approach prevents the vehicle from radically changing its behavior so quickly that the driver is surprised and may not keep up with it. The configurator's 218 speed of updating may be configurable and may be based on how far from the factory setting is the driver's time-rate-of-change of a given control mechanism.

The period of time over which the configurator 218 calculates the time-rate-of-change may vary under varying conditions. If, for example, the racecar 104, 106, 108 is turning sharply (as reported by the lateral accelerometer 214), then the configurator 218 will probably use a very short period for calculating the time-rate-of-change of the steering control mechanism 204 as that may be changing very rapidly.

Instead of or in addition to the above, the configurator 218 may apply a time-weighted series of calculated time-rate-of-changes of a given control mechanism: The most recent calculations may be given the most weight, while slightly older calculations are given less, but still substantial, weight when determining the appropriate value for the actuator's speed of response. This time weighting smooths out very short-term aberrations which may be caused, for example, by the road surface jostling the vehicle rather than from intentional inputs by the driver. In the other direction, the time-weighting calculations may slowly adjust the speed-of-response times to keep them reasonable as the behavior of the machine changes, for example, when the tires slowly overheat and produce less grip in the corners. This is an extended version of varying the period of time over which the time-rate-of-change is calculated and again prevents the vehicle's actuators' configured behavior from changing unnecessarily too rapidly.

In some embodiments, an advanced configurator 218 receives output values from multiple of the control mechanisms in set 202 (step 302 in method 300), calculates from them their multiple time-rate-of-changes (step 306), and applies those multiple time-rate-of-changes when adjusting an actuator's response speed. Similarly, the advanced configurator 218 may use the output values from one or more control mechanisms to change the response speeds of more than one actuator. Such an advanced configurator 218 is programmed to take into account how the various control mechanisms 202 and various actuators 226 interact to control the machine's behavior.

Inputs from the set of sensors 210 may be used by the configurator 218 to quickly refine its methodology based on current conditions experienced by the machine. For example, from information provided by the longitudinal 212 and lateral 214 accelerometers, the configurator 218 may determine that the racecar is in a corner and even which stage of the corner it is in. When the racecar 106 is in mid-corner with the greatest lateral acceleration, it is on the delicate edge of adhesion with the racetrack 100. Here, the configurator 218 may decide to hold off on updating the speed-of-response of the steering actuator 228 until the following straightaway: Even if the current speed-of-response is not entirely suited to the driver's style, it is probably safer to leave it as is for a few seconds for the sake of not surprising the driver or unsettling the racecar 106.

As different drivers may use the same car but have different driving styles, a separate profile (220 in FIG. 2B) may be kept for each driver. The profile 220 may store the calculated speed-of-response values for the actuators 226, while the recent history 224 may store the data used for the configurator's 218 time-weighted analysis. The configurator 218 knows which driver is currently in the vehicle (techniques for this are well known), starts with that driver's profile 220, and modifies it as the track session goes on.

Note the use of "track session" in the previous paragraph. When the operable machine is a motor vehicle, it is contemplated that the configurator 218 works when purposively invoked by a driver such as by choosing a "track mode" in the vehicle. When the vehicle returns to the public road or is turned off, it reverts to the factory settings for the actuators' response speeds. As discussed above, these setting are generally better and less surprising when the vehicle is on the public road. With the results of the previous learning by the configurator 218 stored in the driver's profile 220 and history 224, the vehicle may quick assume the driver's previously learned response times at the next track session.

In some embodiments, the configurator 218 works in concert with other machine-control software. If the machine-control software suspects that the racecar 106 is in danger of spinning (based on, for example, the position of the steering control mechanism 204 and on the sensor values from the lateral accelerometer 214), it may invoke the configurator 218 to adjust the response-speed of the steering actuator 228 temporarily while the machine-control software applies the rear brakes slightly to settle the racecar 106.

While the example of a motor vehicle pervades this discussion, it is kept in mind that the techniques of the present disclosure may apply to varying types of machines that incorporate varying types of control mechanisms, sensors, and actuators. Further, the configurator 218 need not be a separate piece of hardware but could be implemented as a software module running on the machine's general controller. Therefore, it will be understood that many additional changes in the details, materials, steps, and arrangement of parts, which have been herein described and illustrated to explain the nature of the techniques of the present disclosure, may be made by those skilled in the art within the principle and scope of those techniques as expressed in the appended claims.

What is claimed is:

1. A vehicle comprising:
   a first control mechanism configured to produce a first control output value;
   a configurator configured to:
     receive a plurality of first control output values from the first control mechanism;
     calculate a time-rate-of-change of the first control mechanism from the received plurality of first control output values;
     modify a speed-of-response value of a first actuator based, at least in part, on the calculated time-rate-of-change of the first control mechanism; and
     send first actuator control signals to the first actuator, the first actuator control signals based, at least in part, on the modified speed-of-response value of the first actuator and on at least a subset of the received first control output values; and
   the first actuator configured to:
     receive the first actuator control signals from the configurator; and
     based, at least in part, on the received first actuator control signals, alter a first aspect of behavior of the vehicle.

2. The vehicle of claim 1 wherein the first control mechanism is selected from a group consisting of: a steering control mechanism, a braking control mechanism, and an accelerator control mechanism.

3. The vehicle of claim 1 wherein the first actuator is selected from a group consisting of: a steering actuator, a braking actuator, and an accelerator actuator.

4. The vehicle of claim 1 wherein the configurator is further configured to:
   modify the speed-of-response value of the first actuator based, at least in part, on a weighted series of one or more previously calculated time-rate-of-changes of the first control mechanism.

5. The vehicle of claim 1 further comprising:
   a sensor configured to produce a sensor status value;
   wherein the configurator is further configured to:
     receive the sensor status value; and
     modify the speed-of-response value of the first actuator based, at least in part, on the received sensor status value.

6. The vehicle of claim 5 wherein the sensor status value is selected from a group consisting of: lateral acceleration, longitudinal acceleration, and speed.

7. The vehicle of claim 1 further comprising:
   a second control mechanism configured to produce a second control output value;
   wherein the configurator is further configured to:
     receive a plurality of second control output values from the second control mechanism;
     calculate a time-rate-of-change of the second control mechanism from the received plurality of second control output values;
     modify the speed-of-response value of the first actuator based, at least in part, on the calculated time-rate-of-change of the second control mechanism; and
     send first actuator control signals to the first actuator, the first actuator control signals based, at least in part, on the modified speed-of-response value of the first actuator and on at least a subset of the received second control output values.

8. The vehicle of claim 1 further comprising:
a second actuator configured to:
   receive second actuator control signals from the configurator; and
   based, at least in part, on the received second actuator control signals, alter a second aspect of behavior of the vehicle;
wherein the configurator is further configured to:
   modify a speed-of-response value of the second actuator based, at least in part, on the calculated time-rate-of-change of the first control mechanism; and
   send second actuator control signals to the second actuator, the second actuator control signals based, at least in part, on the modified speed-of-response value of the second actuator and on at least a subset of the received first control output values.

9. The vehicle of claim 8 wherein the first and second aspects of behavior are the same aspect.

10. A method for altering an aspect of behavior of a machine comprising a first control mechanism and a first actuator, the method comprising:
receiving a plurality of first control output values;
calculating a time-rate-of-change of the first control mechanism from the received plurality of first control output values;
modifying a speed-of-response value of the first actuator based, at least in part, on the calculated time-rate-of-change of the first control mechanism;
producing first actuator control signals, the first actuator control signals based, at least in part, on the modified speed-of-response value of the first actuator and on at least a subset of the received first control output values; and
based, at least in part, on the produced first actuator control signals, altering a first aspect of behavior of the machine.

11. The method of claim 10 further comprising:
modifying the speed-of-response value of the first actuator based, at least in part, on a weighted series of one or more previously calculated time-rate-of-changes of the first control mechanism.

12. The method of claim 10 further comprising:
receiving a sensor status value; and
modifying the speed-of-response value of the first actuator based, at least in part, on the received sensor status value.

13. The method of claim 10 further comprising:
receiving a plurality of second control output values from a second control mechanism;
calculating a time-rate-of-change of the second control mechanism from the received plurality of second control output values;
modifying the speed-of-response value of the first actuator based, at least in part, on the calculated time-rate-of-change of the second control mechanism;
producing first actuator control signals, the first actuator control signals based, at least in part, on the modified speed-of-response value of the first actuator and on at least a subset of the received second control output values; and
based, at least in part, on the produced first actuator control signals, altering the first aspect of behavior of the machine.

14. The method of claim 10 further comprising:
modifying a speed-of-response value of a second actuator based, at least in part, on the calculated time-rate-of-change of the first control mechanism;
producing second actuator control signals, the second actuator control signals based, at least in part, on the modified speed-of-response value of the second actuator and on at least a subset of the received first control output values; and
based, at least in part, on the produced second actuator control signals, altering a second aspect of behavior of the machine.

15. The method of claim 14 wherein the first and second aspects of behavior are the same aspect.

16. A configurator controlled by a computer processor and configured to:
receive a plurality of first control output values from a first control mechanism;
calculate a time-rate-of-change of the first control mechanism from the received plurality of first control output values;
modify a speed-of-response value of a first actuator based, at least in part, on the calculated time-rate-of-change of the first control mechanism; and
send first actuator control signals to the first actuator, the first actuator control signals based, at least in part, on the modified speed-of-response value of the first actuator and on at least a subset of the received first control output values.

17. The configurator of claim 16 further configured to:
modify the speed-of-response value of the first actuator based, at least in part, on a weighted series of one or more previously calculated time-rate-of-changes of the first control mechanism.

18. The configurator of claim 16 further configured to:
receive a sensor status value; and
modify the speed-of-response value of the first actuator based, at least in part, on the received sensor status value.

19. The configurator of claim 16 further configured to:
receive a plurality of second control output values from a second control mechanism;
calculate a time-rate-of-change of the second control mechanism from the received plurality of second control output values;
modify the speed-of-response value of the first actuator based, at least in part, on the calculated time-rate-of-change of the second control mechanism; and
send first actuator control signals to the first actuator, the first actuator control signals based, at least in part, on the modified speed-of-response value of the first actuator and on at least a subset of the received second control output values.

20. The configurator of claim 16 further configured to:
modify a speed-of-response value of a second actuator based, at least in part, on the calculated time-rate-of-change of the first control mechanism; and
send second actuator control signals to the second actuator, the second actuator control signals based, at least in part, on the modified speed-of-response value of the second actuator and on at least a subset of the received first control output values.

* * * * *